Figure 3:
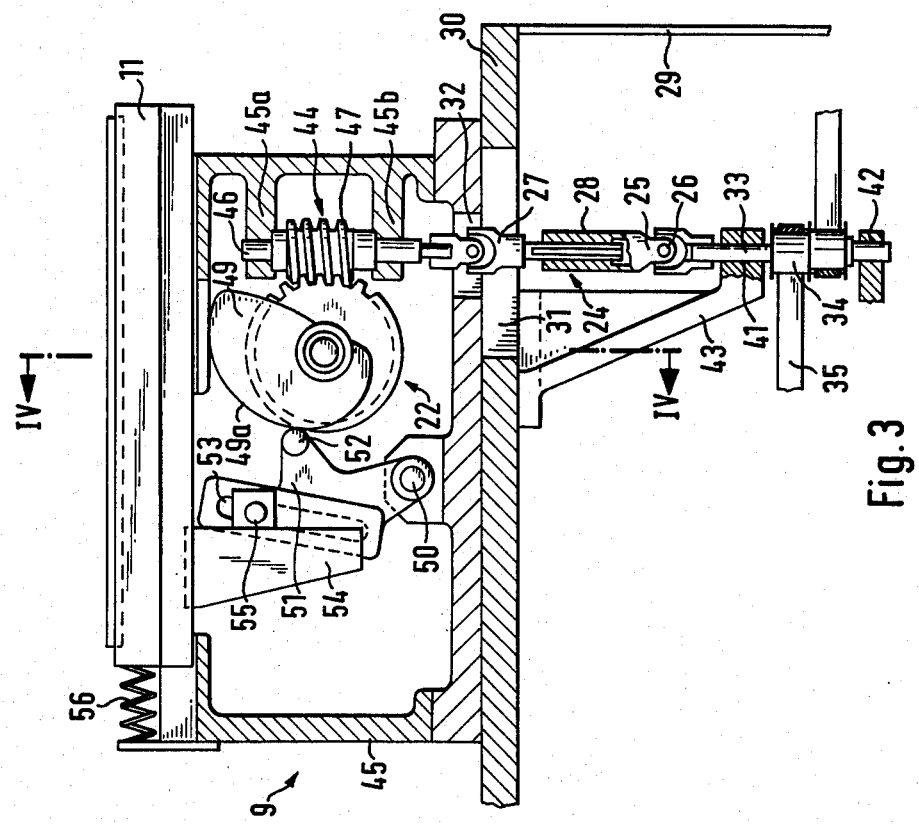

United States Patent [19]

Bader et al.

[11] 4,208,779

[45] Jun. 24, 1980

[54] AUTOMATIC TRANSFER MACHINE

[75] Inventors: Eugen Bader, Rottwell; Kurt Jauch, Bempflingen, both of Fed. Rep. of Germany

[73] Assignee: Antonie Bader, Rottwell, Fed. Rep. of Germany

[21] Appl. No.: 878,136

[22] Filed: Feb. 15, 1978

[30] Foreign Application Priority Data

Feb. 16, 1977 [DE] Fed. Rep. of Germany ....... 2706506

[51] Int. Cl.² ............................................ B23Q 39/04
[52] U.S. Cl. ........................................ 29/563; 29/564
[58] Field of Search ................. 29/563, 564, 565, 566, 29/38 R, 38 A, 38 D, 38 C

[56] References Cited

U.S. PATENT DOCUMENTS

| | | | |
|---|---|---|---|
| 3,143,792 | 8/1964 | Swanson et al. | 29/564 |
| 3,468,010 | 9/1969 | Stauber | 29/563 |
| 3,895,424 | 7/1975 | Hautau | 29/563 X |

FOREIGN PATENT DOCUMENTS 1903173  7/1970  Fed. Rep. of Germany ............. 29/563

*Primary Examiner*—William R. Briggs
*Attorney, Agent, or Firm*—Karl W. Flocks

[57] ABSTRACT

An automatic transfer machine having a plurality of machining units on a common table top with tool carriers above and a common drive below the table top connected through openings in the table top by distributor gears connecting the common drive with intermediate shafts, which shafts are arranged at approximately at right angles relative to the plane of the table top. Universal joint shafts which are telescopically extensible extend through each of the table top openings connecting intermediate shafts from below the table top to step down gears and control elements above the table top.

5 Claims, 6 Drawing Figures

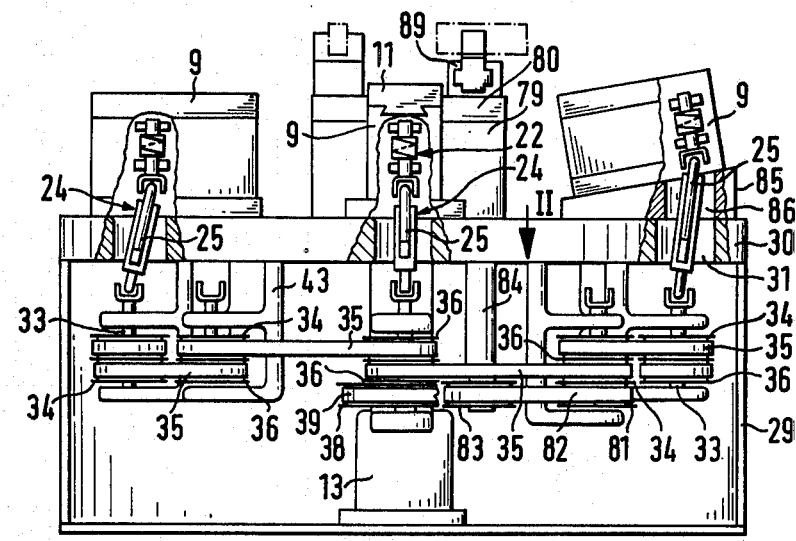
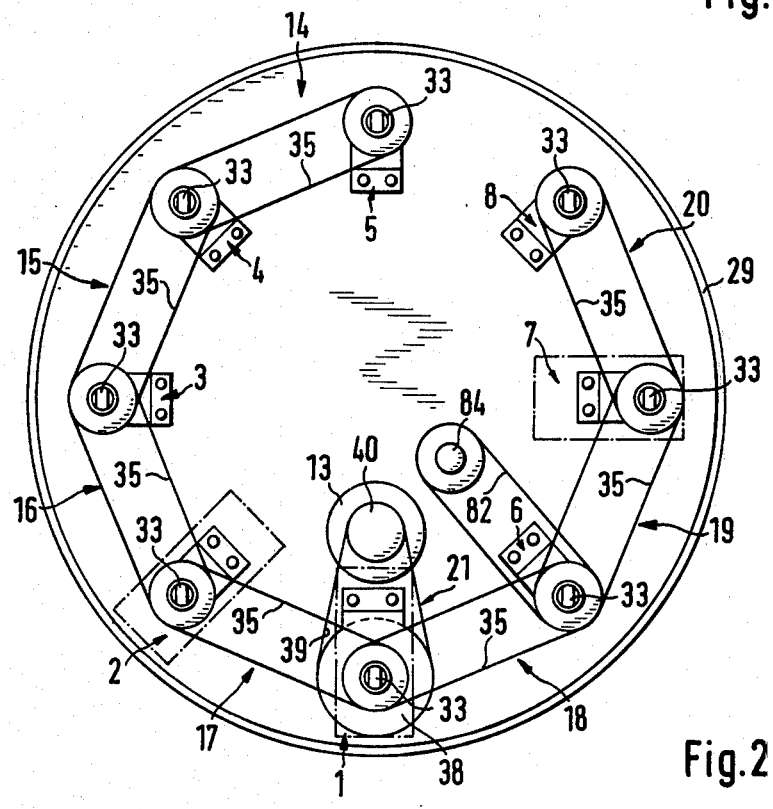

AUTOMATIC TRANSFER MACHINE

The invention relates to an automatic transfer machine comprising a plurality of machining units, each including a housing adjustably arranged on a common table top and at least one tool carrier movably guided at said housings. A common drive means for movements of the tool carriers relative to the respective housings belongs to the automatic transfer machine and is disposed under the table top. The automatic transfer machine further comprises gear assemblies connecting the drive means through an opening each in the table top with one of the tool carriers each and an intermediate shaft each stationarily supported under the table top, a telescopically extensible universal joint shaft each, and a step-down gear each firmly connected with the respective housing. Each of said step-down gears drives a control element provided with at least one cam face and acting on the corresponding tool carrier.

With an automatic transfer machine of this kind known from German Offenlegungsschrift No. 1 903 173 the intermediate shafts which are stationarily supported under the table top are oriented radially with respect to a central drive shaft. A bevel pinion each is fixed at the radial inner end of those intermediate shafts. The bevel pinions of all the intermediate shafts mesh with a common gear fixed on the central drive shaft. The intermediate shafts each drive a step-down gear by way of a telescopically extensible universal joint shaft likewise arranged substantially radially under the table top. The step-down gears are also disposed under the table top. Yet they are firmly connected with the housing of the respective machining unit arranged for displacement above the table top. This connection is established by the fact that the housing of each machining unit comprises an extension projecting downwards through a rather large opening in the table top and being designed in its lower portion as a gear housing for the corresponding step-down gear. A disc-shaped control body is fixed below the table top on the driven shaft of each step-down gear and, by means of a cam formed at its periphery, it moves a cam follower lever supported at the respective gear housing up and down. A push rod of adjustable length is pivotally mounted at the free end of each cam follower lever and extends substantially vertically upwards through the respective opening in the table top and moves a toothed segment back and forth which is supported in the housing of the respective machining unit. The toothed segment is in meshing engagement with a rack formation at the corresponding tool carrier so that the latter carries out rectilinear reciprocating motions.

In this known automatic transfer machine the power transmission paths described between the central drive shaft and the step-down gears cause no problem since they transmit the required drive energy for the motions of the tool carrier at high numbers of revolution and low torques so that the intermediate and universal joint shafts are loaded with moderate torques only. Difficulties did occur, however, in the transmission of energy between the step-down gears and the associated tool carriers because the push rods which are more or less long, depending on the arrangement and design of the corresponding machining unit, are loaded by considerable forces. Sufficiently rigid power transmission between the transmission gear and the corresponding tool carrier requires rather powerful dimensioning of the push rod disposed in between. This, however, meets with limits because of the fact that at sturdy dimensions the mass moment of inertia and also the space requirement grow accordingly. It proved to be another disadvantage of the known automatic transfer machine of the kind in question that adjustment of a machining unit requires a change in length of the corresponding push rod. This is a time-consuming operation since the push rods are not easily accessible and every adjustment of a machining unit also changes the angle of the corresponding push rod relative to the corresponding cam lever whereby the movement transmitted by the cam to the associated tool carrier becomes distorted in its course of time, thereby possibly necessitating further corrections. Moreover, it is difficult with the known automatic transfer machine to replace the control elements by others having other cam faces since the gear housings below the table top do not offer easy access.

Therefore, it is the object of the invention to improve the connections between the common drive means arranged below the table top of an automatic transfer machine of the kind defined initially and the tool carriers of the individual machining units such that power transmission paths are obtained which are of increased stiffness and, at the same time, better adaptability to different working conditions is achieved.

The problem is solved, in accordance with the invention, in that the common drive means is connected by distributor gears with the intermediate shafts, in that the intermediate shafts are arranged at least approximately at right angles relative to the plane of the table top, in that the universal joint shafts extend through the openings in the table top into the housings of the machining units, and in that the step-down gears and the control elements are arranged above the table top.

As compared to the known automatic transfer machine described the distributor gears of the rotary automatic transfer machine according to the invention present additional structural groups. Yet the additional expenditure this requires, in general, is more than balanced by other savings. Savings can be made, for instance, by virtue of the very short length which the intermediate shafts in the automatic transfer machine according to the invention may have since it is no longer their function to bridge a more or less great distance between the corresponding universal joint shaft and the central drive means. Further savings result from the fact that the control elements which are disposed above the table may cooperate in a direct way with the corresponding tool carrier without intermission of push rods. Besides, the distributor gears may be chain drives or toothed belt drives which can be produced at low cost and may be used to bridge almost any distance. On the whole, therefore, the costs for an automatic transfer machine according to the invention, in general, are not higher but more likely lower than the costs for the known automatic transfer machine described. At any rate, a number of advantages are realized by the invention. Above all, the spacing and number of structural elements transmitting motion between each control element and the corresponding tool carrier can be kept lower than with the known automatic transfer machine. Therefore, the invention affords the advantage of a stiff and exact transfer of motion between the control elements and the tool carriers. If a machining unit is to be adjusted on the table top, this can be accomplished with a just a few manipulations.

In a preferred embodiment of the invention the drive shafts of the step-down gears are disposed parallel to the intermediate shafts, in other words also at least approximately at right angles with respect to the plane of the table top. This serves to avoid any distortion in the transfer of motion between the common drive means and the step-down gears.

As with the known automatic transfer machine described also with the automatic transfer machine according to the invention a lever may be supported next to each control element to sense the cam face of the control element and convert rotation of the cam into reciprocating movements of the corresponding tool carrier. In accordance with the invention this design preferably is developed further in that the lever is disposed inside the housing of the corresponding machining unit above the table top and directly engages the respective tool carrier.

The term automatic transfer machine as used in the foregoing is intended to express that workpieces are moved automatically from one machining unit to the next by any desired means of conveyance. On principle, it makes no difference for the application of the invention whether the path which the workpieces follow is rectilinear or circular since the distributor gears according to the invention permit the most varied arrangements of the machining units with respect to one another. However, the most important field of use of the invention are automatic transfer machines with circular movement of the workpieces. Such machines are known in various forms, called indexing table, indexing plate, indexing drum machines or rotary cycle machines.

Figure 4:
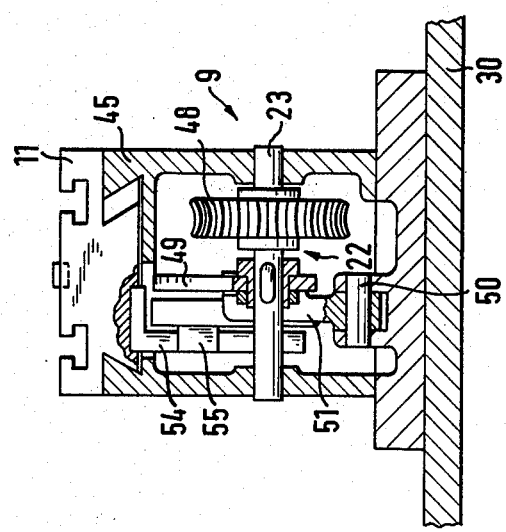
Figure 6:
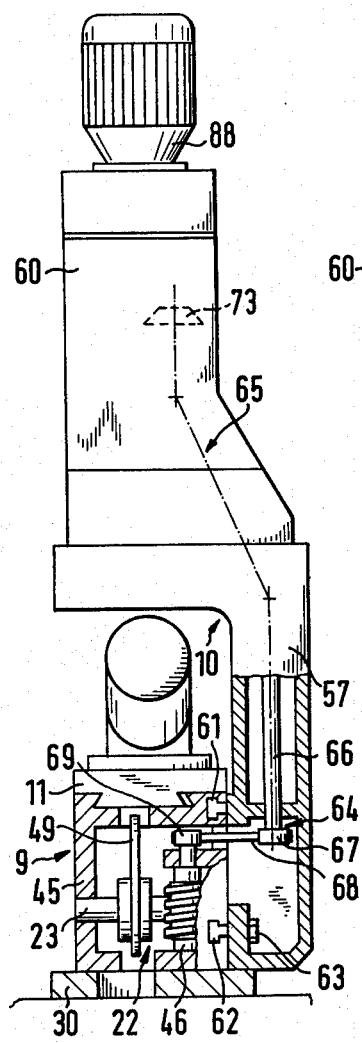
Figure 5:
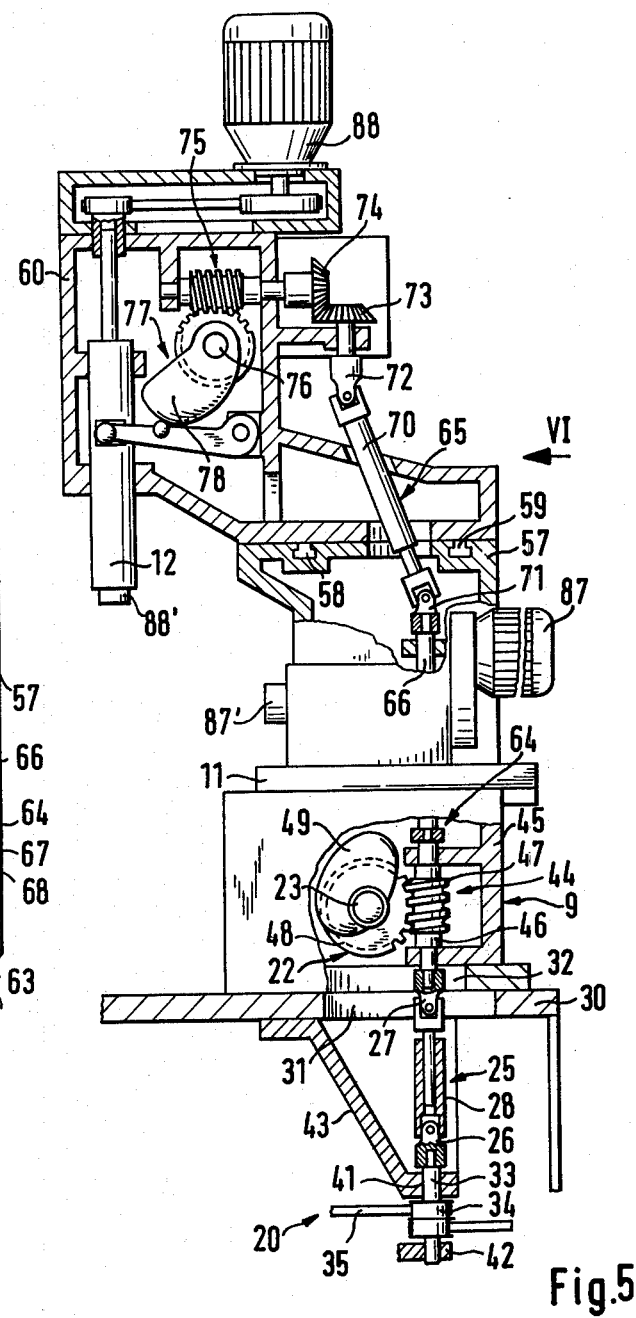

Embodiments of the invention will be described below with reference to diagrammatic drawings, in which:

FIG. 1 is a side elevational view of an indexing table machine with eight working stations, FIG. 2 is a view of the indexing table machine as seen in the direction of arrow II in FIG. 1, with the table top removed, FIG. 3 is an enlarged vertical longitudinal sectional view of one of the working stations shown in FIG. 1, FIG. 4 is a vertical cross sectional view along lines IV—IV of FIG. 3, FIG. 5 is a side elevational view, partly in vertical section, of another working station, and FIG. 6 is a view of the same working station as seen in the direction of arrow VI in FIG. 5, likewise partly in vertical section.

The indexing table machine shown comprises eight working stations 1 to 8 arranged approximately in a circle. At least one machining unit 9 and, if desired, an additional machining unit 10 such as shown in FIGS. 5 and 6 belongs to each working station 1 to 8. A tool carrier each is associated with machining units 9 and 10 and may be connected indirectly or directly with a tool. For instance, a tool carrier 11 embodied by a slide is associated with machining unit 9. Further structural groups, such as machining unit 10 may be installed on said slide. As shown in FIG. 5, a tool carrier 12 in the form of a turning, boring or milling spindle sleeve 21 is directly guided in machining unit 10.

Working stations 1 to 8 have a common drive means 13 which is connected through distributor gears 14 to 21 with a control means 22 each in the individual machining units 9. Each control means 22 includes a control shaft 23 and is driven by a universal joint shaft 25 permitting changes in position of the corresponding machining unit 9 along all three axes of a coordinate system in space. Each universal joint shaft 25 comprises two universal joints 26 and 27 between which a telescopically extensible intermediate member 28 is arranged.

In accordance with FIG. 1 the common drive means 13 and the distributor gears 14 to 21 are disposed within a lower frame 29 carrying a table top 30 on which machining units 9 and 10 are arranged so as to be adjustable. Below each machining unit 9 an opening 31 is provided in table top 30 in alignment with an aperture 32 at the underside of the corresponding machining unit 9. The universal joint shafts 25 extend through openings 31 and apertures 32.

The individual distributor gears 14 to 21 are connected, partly in parallel and partly behind one another, in such manner that the drive motion of one distributor gear is always derived from an adjacent distributor gear or the central drive means 13. For instance, the drive motion of distributor gear 14 is derived from distributor gear 15 while the drive motion of distributor gear 15 is derived from distributor gear 16. To avoid overloading of individual distributor gears the drive chain formed by the distributor gears is divided into two partial chains approximately having the same size, starting from distributor gear 21 of working station 1, and preferably being driven in synchronism. Distributor gears 14 to 17 form one partial chain, whereas distributor gears 18 to 20 constitute the second partial chain. Distributor gear 21 which drives both partial chains receives its driving motion from the central drive means 13. Each of the eight distributor gears 14 to 21 is designed as a toothed belt drive.

An intermediate shaft 33 carrying at least one toothed belt pulley 34 over which a toothed belt 35 is guided from a second toothed belt pulley 36 on the intermediate shaft 33 of the adjacent working station belong to each working station 1 to 8. Intermediate shaft 33 of working station 1 carries a third toothed belt pulley 38 connected by means of a toothed belt 39 with a toothed belt pulley 40 of the central drive means 13. The intermediate shafts 33 of the individual working stations 1 to 8 are supported below the corresponding machining unit 9 in stationary bearings 41 and 42 disposed in such manner in bearing blocks 43 at the underside of table top 30 that the intermediate shafts 33 are oriented at least approximately at right angles relative to the table top 30.

Each universal shaft 25 is connected with the control shaft 23 of the corresponding control means 22 by a step-down gear 44 designed in the present embodiment as a worm gear. The control means 22 of each machining unit 9 is arranged within a housing 45. In the interior of housing 45 two flanges 45a and 45b are formed in which the drive shaft 46 of the corresponding step-down gear 44 is supported. A worm 47 is fixed on drive shaft 46 and meshes with a worm gear 48 which is secured against rotation on control shaft 23. A control element 49 is fixed on control shaft 23 and provided at its periphery with a cam face 49a. Furthermore, a lever 51 is pivotally supported on a fixed shaft 50 inside housing 45. The lever carries a cam follower roller 52 to sense cam face 49a and comprises a guide slot 53 in which a sliding block 55 supported on a projection 54 of tool carrier 11 is guided.

When the control shaft 23 rotates together with control element 49 lever 51 is swung by cam face 49a about axis 50. This swinging movement is converted by means of guide slot 53 and sliding block 55 into axial displacement of machining unit 11 against the force of a spring 56.

As shown in FIGS. 5 and 6, each working station 1 to 8 may comprise an additional machining unit 10 such as shown in FIGS. 5 and 6. Machining unit 10 has a support column 57 arranged at housing 45 of machining unit 9 and including guide elements 58 and 59 along which a housing 60 is guided for displacement transversely of the shifting direction of tool carrier 11. Tool carrier 12, in the embodiment shown represented by a spindle sleeve, is guided for vertical displacement at the front part of housing 60. Support column 57 is guided for displacement parallel to the shifting direction of tool carrier 11 by means of guide elements 61 and 62 at housing 45. It can be fixed in any desired position of displacement by means of screws 63.

Machining unit 10 may be controlled according to FIGS. 5 and 6 from distributor gear 20 in synchronism with machining unit 9 by means of an intermediate gear 64 and another universal joint shaft 65. The intermediate gear 64 and the universal joint shaft 65 are arranged above table top 30 inside support column 57. Intermediate gear 64 consists of a drive shaft 66 with a toothed belt pulley 67 guiding a toothed belt 68 toward a toothed belt pulley 69 which is secured on drive shaft 46 of step-down gear 44 in machining unit 9. Universal joint shaft 65 comprises an intermediate member 70 which is extensible like a telescope and connected by a universal joint 71 with drive shaft 66 and by another universal joint 72 with a bevel gear 73 rotatable about a vertical axis. Bevel gear 73 is in meshing engagement with a bevel gear 74 rotatable about a horizontal axis and secured on the drive shaft of a step-down gear 75 likewise designed as a worm gear.

Step-down gear 75 drives a control shaft 76 belonging to a control means 77 in housing 60. A control element 78 is fixed on control shaft 76 and converts the rotation of control shaft 76 into a vertical advance movement of tool carrier 12.

An indexing unit 79 comprising a rotatable indexing plate 80 is arranged in the center of table top 30, as shown in FIG. 1. The intermediate shaft 33 of working station 6 carries another toothed belt pulley 81 over which a toothed belt 82 is guided toward a toothed belt pulley 83 mounted on a drive shaft 84 of indexing plate 80 so as to drive indexing plate 80 in stepwise motion. Work locating fixtures 89 for a workpiece each are arranged on indexing plate 80.

The design of the indexing table machine in accordance with the invention makes it possible to displace the machining units 9 not only in any desired direction in the plane of table top 30 but also permits them to be brought into a position in which they adopt almost any desired angle of inclination relative to the plane of the table top. This is shown diagrammatically in the right half of FIG. 1. Here machining unit 9 is fixed on a wedge-shaped intermediate piece 85 clamped on table top 30 and provided with a port 86 for passage of the corresponding universal joint shaft 25. Port 86 is aligned with aperture 32 at the underside of the respective machining unit 9 and with the corresponding opening 31 in table top 30, and all the holes are so dimensioned that universal joint shaft 25 can rotate without any disturbance even when positioned strongly inclined.

An electric motor 87 is flange-connected with support column 57 and drives a turning, boring or milling spindle 87' which is supported horizontally in said support column. In corresponding manner an electric motor 88 is flange-connected with housing 60 and drives a spindle 88' guided in tool carrier 12.

What is claimed is:

1. An automatic transfer machine, comprising a plurality of machining units, each of said plurality of machining units including a housing adjustably arranged on a common table top and at least one tool carrier movably guided at said housings, a common drive means connected for movement of the tool carriers relative to the respective housings, and gear assemblies connecting the drive means through an opening for each of said machining units in the table top with one of each of said tool carriers, and an intermediate shaft each rotatably supported under the table top, a telescopically extensible universal joint shaft for each of said machining units, and a step-down gear each firmly connected with the respective housing, each of said step-down gears driving a control element provided with at least one cam face and acting on the corresponding tool carrier, characterized in that the common drive means (13) is connected with the intermediate shafts (33) by distributor gears (14 to 21), in that the intermediate shafts (33) are arranged approximately at right angles relative to the plane of the table top (30), in that the universal joint shafts (25) extend through the openings (31) in the table top (30) into the housings (45) of the machining units (9), and in that the step-down gears (44) and the control elements (49) are disposed above the table top (30).

2. An automatic transfer machine according to claim 1, characterized in that the distributor gears (14 to 21) are chain drives.

3. An automatic transfer machine according to claim 1 or 2, characterized in that the drive shafts (46) of the step-down gears (44) are arranged parallel to the intermediate shafts (33).

4. An automatic transfer machine according to claim 1 or 2 with which a lever is supported next to each control element to follow the cam face and convert the rotation thereof into reciprocating movements of the corresponding tool carrier, characterized in that the lever (51) is arranged within the housing (45) of the corresponding machining unit (9) above the table top (30) and directly engages the respective tool carrier (11).

5. An automatic transfer machine according to claim 1, characterized in that the distributor gears are toothed belt drives.

* * * * *